United States Patent
Quarfoth et al.

(10) Patent No.: US 11,528,042 B1
(45) Date of Patent: Dec. 13, 2022

(54) ACTIVE ANTENNA TRANSMITTER

(71) Applicant: HRL Laboratories, LLC, Malibu, CA (US)

(72) Inventors: Ryan Quarfoth, Malibu, CA (US); Carson White, Malibu, CA (US)

(73) Assignee: HRL LABORATORIES, LLC, Malibu, CA (US)

(*) Notice: Subject to any disclaimer, the term of this patent is extended or adjusted under 35 U.S.C. 154(b) by 94 days.

(21) Appl. No.: 17/202,194

(22) Filed: Mar. 15, 2021

Related U.S. Application Data

(60) Provisional application No. 63/016,696, filed on Apr. 28, 2020.

(51) Int. Cl.

| | |
|---|---|
| *H04B 1/04* | (2006.01) |
| *H01Q 1/24* | (2006.01) |
| *H03F 1/02* | (2006.01) |
| *H03F 3/24* | (2006.01) |
| *H01Q 9/06* | (2006.01) |
| *H01Q 13/18* | (2006.01) |

(52) U.S. Cl.
CPC ............. *H04B 1/04* (2013.01); *H01Q 1/24* (2013.01); *H01Q 9/06* (2013.01); *H01Q 13/18* (2013.01)

(58) Field of Classification Search
None
See application file for complete search history.

(56) References Cited

U.S. PATENT DOCUMENTS

| | | | | |
|---|---|---|---|---|
| 7,642,981 | B2* | 1/2010 | Kanno | H01Q 13/10 343/767 |
| 7,710,338 | B2* | 5/2010 | Fujishima | H01Q 13/10 343/859 |
| 8,121,544 | B2* | 2/2012 | Shimizu | H01Q 13/10 343/756 |
| 8,487,821 | B2* | 7/2013 | Duron | H01Q 1/2216 343/729 |
| 8,907,857 | B2* | 12/2014 | Nysen | H01Q 5/40 343/729 |
| 9,203,477 | B2* | 12/2015 | Nakayama | H01Q 21/28 |

(Continued)

OTHER PUBLICATIONS

Sievenpiper, D. F. et al., "Experimental Validation of Performance Limits and Design Guidelines for Small Antennas", IEEE Transactions on Antennas and Propagation, 2011, pp. 8-19, vol. 60, No. 1, IEEE.

*Primary Examiner* — Pablo N Tran

(74) *Attorney, Agent, or Firm* — Lewis Roca Rothgerber Christie LLP

(57) ABSTRACT

A transmitting circuit. In some embodiment, the transmitting circuit includes a slot antenna and an amplifier. The slot antenna may include a slot in a conductive sheet, and it may have a first resonant frequency, the first resonant frequency being within 20% of a slot frequency which is between a first frequency corresponding, in a first volume, to a wavelength twice the length of the slot, and a second frequency corresponding, in a second volume, to a wavelength twice the length of the slot. The amplifier may be connected to the slot through a connection including a conductive path, between the amplifier and the slot, having a length less than 0.2 times the length of the slot. The magnitude of the output impedance of the amplifier may be less than 0.25 times the magnitude of the impedance of the slot antenna at a first resonant frequency.

17 Claims, 12 Drawing Sheets

(56) References Cited

U.S. PATENT DOCUMENTS

| | | | | |
|---|---|---|---|---|
| 10,149,636 B2* | 12/2018 | Dumanli Oktar | ...... | H01Q 1/273 |
| 2003/0174095 A1* | 9/2003 | Sievenpiper | ........... | H01Q 13/18 |
| | | | | 343/770 |
| 2010/0265146 A1* | 10/2010 | Montgomery | ......... | H01Q 1/521 |
| | | | | 343/722 |
| 2011/0068990 A1* | 3/2011 | Grzyb | ..................... | H01P 5/024 |
| | | | | 343/772 |
| 2013/0183917 A1 | 7/2013 | Asuri et al. | | |
| 2016/0197398 A1* | 7/2016 | Scheim | ................. | H01Q 1/286 |
| | | | | 343/713 |

* cited by examiner

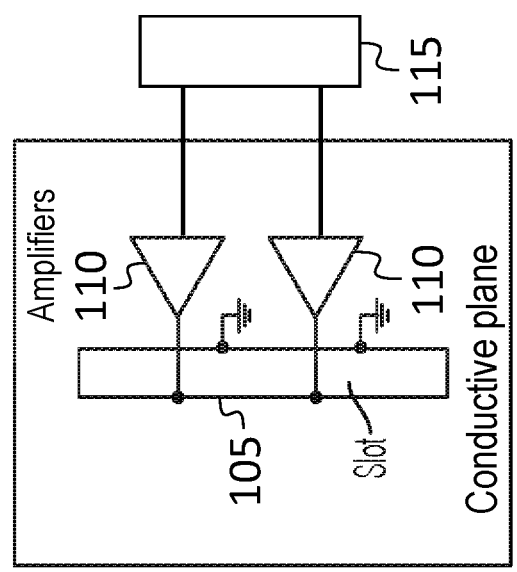

ACTIVE ANTENNA TRANSMITTER

CROSS-REFERENCE TO RELATED APPLICATION(S)

The present application claims priority to and the benefit of U.S. Provisional Application No. 63/016,696, filed Apr. 28, 2020, entitled "CONFORMAL ACTIVE ANTENNA TRANSMITTER", the entire content of which is incorporated herein by reference.

FIELD

One or more aspects of embodiments according to the present disclosure relate to antennas, and more particularly to a broadband active transmitting antenna.

BACKGROUND

Any of various resonant antenna designs, such as slot antennas and cavity-backed-slot antennas, may provide acceptable efficiency when operated as a transmitting antenna driven, by a power amplifier, through a matching network that transforms the output impedance of the power amplifier to an impedance that is approximately equal to the complex conjugate of the input impedance of the antenna feed. Such a configuration, however, may have relatively narrow bandwidth.

Thus, there is a need for a broadband active transmitting antenna.

SUMMARY

According to an embodiment of the present invention, there is provided a transmitting circuit, including: a slot antenna; and a first amplifier, the slot antenna including a slot in a conductive sheet, the slot having a length, the slot antenna having a first resonant frequency, the first resonant frequency being within 20% of a slot frequency, the slot frequency being between: a first frequency corresponding, in a first volume, on a first side of the slot, to a wavelength twice the length of the slot, and a second frequency corresponding, in a second volume on a second side of the slot, to a wavelength twice the length of the slot, the first amplifier being connected to the slot through a connection including a conductive path, between the first amplifier and the slot, having a length less than 0.2 times the length of the slot, the slot antenna having an impedance at the first resonant frequency, the first amplifier having an output impedance, at the first resonant frequency, the magnitude of the output impedance of the first amplifier, at the first resonant frequency, being less than 0.25 times the magnitude of the impedance of the slot antenna at the first resonant frequency.

In some embodiments, the slot is a rectangular slot with an aspect ratio greater than 5 to 1.

In some embodiments, the first amplifier is connected to the slot at a distance from an end of the slot, the distance being within 30% of one half of the length of the slot.

In some embodiments, the slot is an annular slot.

In some embodiments, the slot has a reflective cavity backing.

In some embodiments, the reflective cavity has a resonant frequency within 10% of the first resonant frequency.

In some embodiments, the magnitude of the output impedance of the first amplifier, at the first resonant frequency, is less than 0.1 times the magnitude of the impedance of the slot antenna at the first resonant frequency.

In some embodiments, the first amplifier includes a first stage configured to provide voltage gain, and a second stage configured to provide a reduction in output impedance.

In some embodiments, the second stage includes a transistor in a common drain or common collector configuration.

In some embodiments, the first stage includes a transistor in a common source configuration.

In some embodiments, the first amplifier includes a gallium arsenide or gallium nitride transistor.

In some embodiments, the first amplifier includes two transistors fabricated on a single monolithic integrated circuit.

In some embodiments, the transmitting circuit further includes a second amplifier, wherein: the first amplifier is connected to the slot antenna at a first point along the slot, and the second amplifier is connected to the slot antenna at a second point along the slot, the second point being different from the first point.

In some embodiments, the transmitting circuit further includes a signal source having a first output and a second output, wherein: the first output is connected to an input of the first amplifier, the second output is connected to an input of the second amplifier, the signal source is configured to supply: a first linear combination of a plurality of mode signals at the first output, and a second linear combination of the plurality of mode signals at the second output.

In some embodiments: the first linear combination is proportional to a first mode signal of the plurality of mode signals, and the second linear combination is proportional to a second mode signal of the plurality of mode signals.

In some embodiments: over a frequency range spanning an octave and including the first resonant frequency, the transmitting circuit has a gain varying by less than 20 dB; and the transmitting circuit is configured to transmit at least 0.05 W at the first resonant frequency.

In some embodiments: over a frequency range spanning an octave and including the first resonant frequency, the transmitting circuit has a gain varying by less than 30 dB; and the transmitting circuit is configured to transmit at least 0.5 W at the first resonant frequency.

BRIEF DESCRIPTION OF THE DRAWINGS

These and other features and advantages of the present disclosure will be appreciated and understood with reference to the specification, claims, and appended drawings wherein:

FIG. 1C is a schematic top view of a transmitting circuit including an active cavity-backed-slot antenna, according to an embodiment of the present disclosure;

DETAILED DESCRIPTION

The detailed description set forth below in connection with the appended drawings is intended as a description of exemplary embodiments of a broadband active transmitting antenna provided in accordance with the present disclosure and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the scope of the disclosure. As denoted elsewhere herein, like element numbers are intended to indicate like elements or features.

Figure 1A:
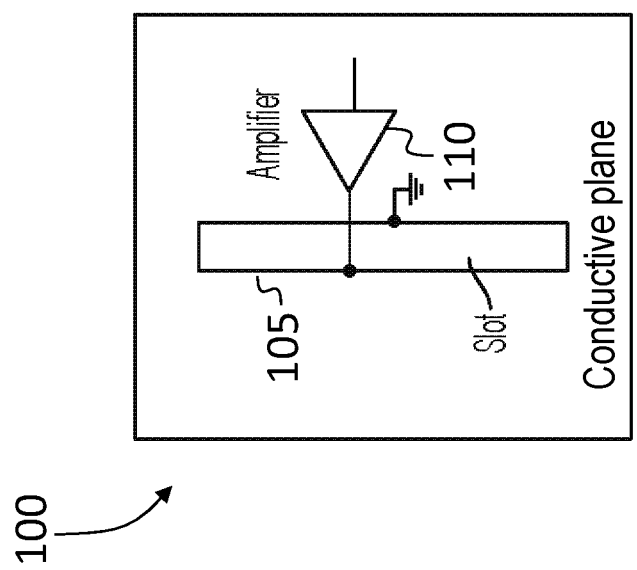
FIG. 1A is a schematic top view of an active cavity-backed-slot antenna, according to an embodiment of the present disclosure.
Figure 1B:
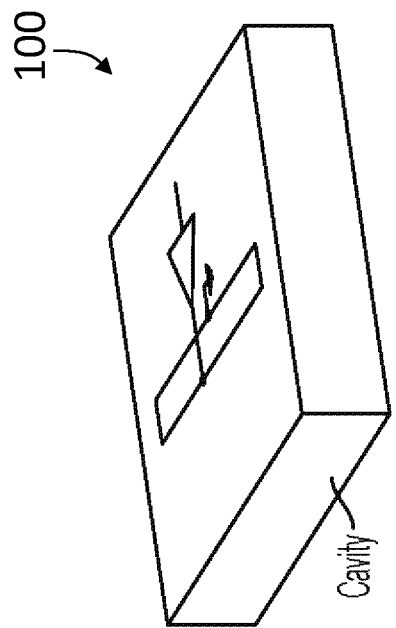
FIG. 1B is a schematic perspective view of an active cavity-backed-slot antenna, according to an embodiment of the present disclosure.

Referring to FIG. 1A, in some embodiments, a slot antenna 100 is coupled to a low-impedance transmit amplifier 110. The slot antenna 100 may be an aperture cut into a large conductive plane, or into a surface of a conductive cavity, as shown in FIG. 1B. In some cases, the slot 105 is rectangular and has an aspect ratio (the ratio of length to width) greater than 3:1 or greater than 10:1. The amplifier 110 may be a single-ended amplifier, with an output connected to one edge of the slot 105; the other edge of the slot may be grounded, as shown. The slot 105 may have various shapes, and may be, for example, annular, or rectangular as shown. The slot may have a length of approximately one half of the wavelength of operation (i.e., the wavelength corresponding to the frequency of operation, equal to the speed of light divided by the frequency of operation). The length of the slot is within 30% of one half of the wavelength of operation, or it may be between one quarter and three quarters of the wavelength of operation. As mentioned above, and as shown in FIG. 1B, the slot 105 may be backed by a conductive cavity that allows transmission from only a single side and isolates the antenna from the environment on the other side. For example, the slot 105 may open into an enclosure with conductive walls, as shown in FIG. 1B, the enclosure being hollow or filled with a dielectric, to form a configuration that may be referred to as a cavity-backed-slot antenna (CBSA).

In some embodiments, the amplifier 110 is connected (e.g., directly connected) to one edge or to both edges of the slot 105, e.g., without a transmission line, and without a matching network, between the amplifier 110 and the slot 105. In some embodiments at most a short section of transmission line (e.g., having a length of less than 0.1 wavelengths or a less of less than 0.2 times the length of the slot) is present between the amplifier output and the slot. The point along the slot, or "feed", at which the amplifier is connected to the slot may be near the middle of the slot, e.g., at a distance, from one end of the slot, that is within 30% of one half of the length of the slot. The amplifier 110 may have a low output impedance, e.g., an output impedance that is substantially lower (in magnitude) than the impedance of the slot antenna at first resonance. In some embodiments, the magnitude of the output impedance of the first amplifier, at the first resonant frequency, is less than 0.25 (or less than 0.1) times the magnitude of the impedance of the slot antenna at the first resonant frequency. In some embodiments, additional feeds may be added, e.g., two or more amplifiers may be coupled to the slot 105, e.g., each being coupled to a different point along the length of the slot 105, as shown in FIG. 1C, and as discussed in further detail below.

Figure 2A:
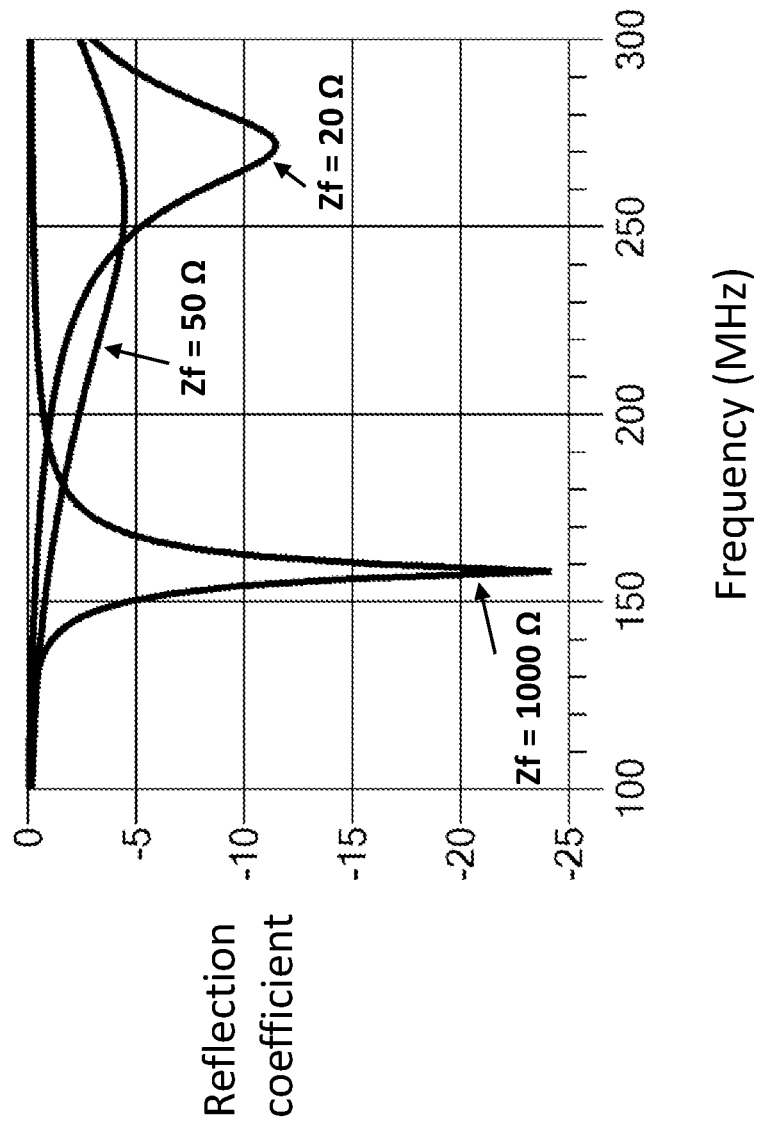
FIG. 2A is a graph of antenna characteristics, according to an embodiment of the present disclosure.
Figure 2B:
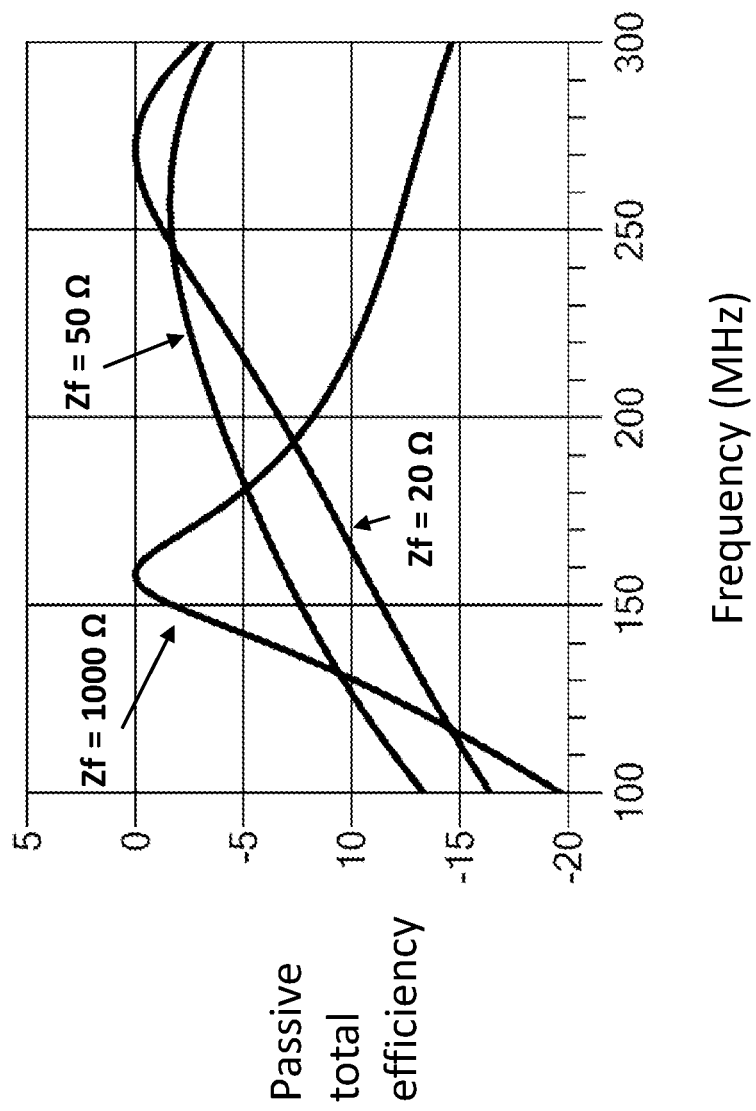
FIG. 2B is a graph of antenna characteristics, according to an embodiment of the present disclosure.

The first resonance of the slot 105 may occur at a frequency for which the length of the slot 105 is approximately (e.g., within 5% of, within 10% of, or within 20% of) one-half wavelength, i.e., $\lambda/2$. The relevant wavelength for any frequency of operation may be the wavelength in the volume on one side of the slot (e.g., inside the cavity, which may be empty or (as mentioned above) filled with a dielectric), or it may be the wavelength in a volume on the other side of the slot (which may be outside the cavity, and may be in air or vacuum), or it may be between the two wavelengths. As such, in some embodiments, the slot antenna has a first resonant frequency, the first resonant frequency being within 20% of a "slot frequency", the slot frequency being between (i) a first frequency corresponding, in a first volume, on a first side of the slot, to a wavelength twice the length of the slot, and (ii) a second frequency corresponding, in a second volume on a second side of the slot, to a wavelength twice the length of the slot. The cavity may be sized to have its first resonance occur near (e.g., within 10% of) this frequency. In one example, a cavity-backed-slot antenna has a cavity with length=width=1 m, depth=0.25 m, slot length=0.97 m and slot width=0.01 m. This antenna resonates at 160 MHz with an impedance, at the resonant frequency, of approximately 1000 ohms. In some embodiments, an antenna with different but similar dimensions is used, each dimension being within 30% of the dimensions listed above. FIG. 2A shows the reflection coefficient of the slot 105 for three different feed impedance values (20 ohms, 50 ohms, and 1000 ohms, which may, for example, be provided using lossy impedance matching), and FIG. 2B shows the passive total efficiency of the slot 105 for the same three different feed impedance values (20 ohms, 50 ohms, and 1000 ohms). It may be seen from the curve, in FIG. 2A, for 1000 ohms, (which has a refection coefficient of less than −23 dB at a frequency of about 160 MHz) that the impedance of the slot 105 at the resonant frequency is approximately 1000 ohms.

It may be seen from FIG. 2B that the bandwidth is relatively narrow when a conjugate match is achieved, e.g., when the output impedance of the drive circuit is 1000 ohms. The bandwidth may be increased by reducing the feed impedance, but, in a region including the resonant frequency, this reduces the gain, which may reduce the DC-to-RF efficiency, or "wall plug efficiency". This reduction in wall plug efficiency may increase the amount of fuel, or battery power, consumed when the transmitter operates, and it may also require larger and costlier transmitter electronics, and a system for removing the heat dissipated by the loss.

Figure 3A:
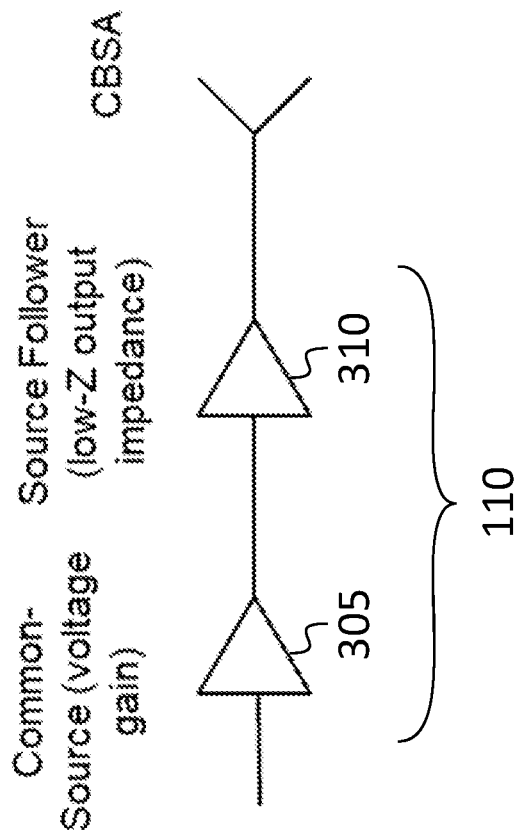
FIG. 3A is a schematic diagram of a transmitting circuit, according to an embodiment of the present disclosure.
Figure 3B:
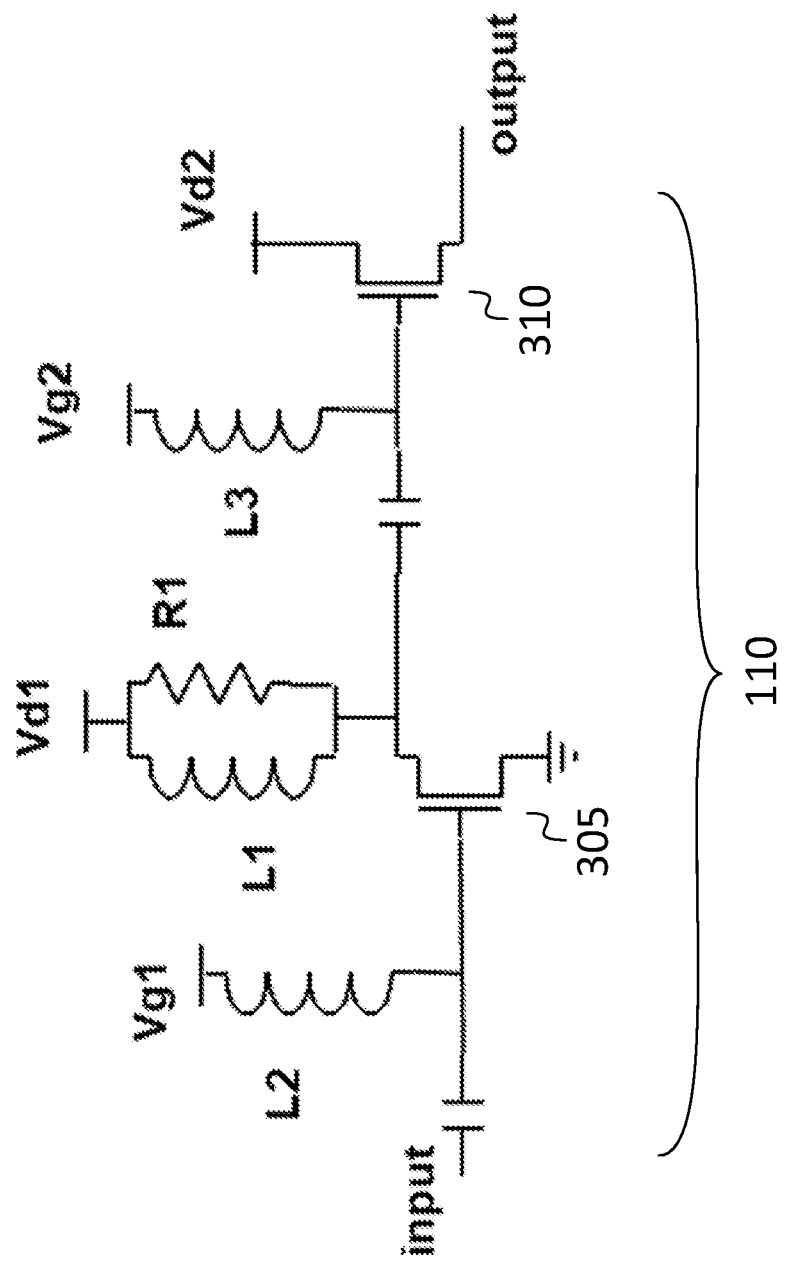
FIG. 3B is a schematic diagram of a power amplifier, according to an embodiment of the present disclosure.

In some embodiments, the aperture is driven, as mentioned above, by an amplifier with a low output impedance and with high gain. FIG. 3A shows such a transmitting circuit, in some embodiments. The amplifier 110 may include a common-source amplifier 305 followed by a source-follower (or common drain amplifier) 310, that is coupled to the cavity-backed-slot antenna. The source follower amplifier may (i) have a low output impedance, given by 1/gm, where gm is the transconductance, and may (ii) lack voltage gain. Therefore, in some embodiments, an input stage with high voltage gain, such as a common source stage, is employed. An example of the two-stage amplifier 110 is shown in FIG. 3B. The bias current for the input stage flows through a choke inductor L1. A resistor R1 may be connected in parallel with the choke inductor L1 in order to provide a real load to the first stage; in some embodiments, R1 is absent. In some embodiments, the resistance R1 is large in order to provide high voltage gain (to first order given by gm*R1), such that a high voltage can be applied to the high impedance antenna. Choke inductors L2 and L3 may be replaced with other gate bias circuits (e.g., each of these inductors may be used in combination with, or replaced by, one or more resistors). The output of the amplifier 110 may be DC coupled to the antenna such that the bias current flows through the antenna. In other embodiments the amplifier 110 is AC coupled to the antenna, and a bias connection to the source of the source-follower 310 is made otherwise, e.g., through an inductor.

FIGS. 4A-5C show results of simulations of one embodiment. In this embodiment, the input stage includes a 2×75 um gallium nitride (GaN) high electron mobility transistor (HEMT) (i.e., a HEMT with two 75 um wide gates, each of which may have a length of 0.5 um) and the output stage includes a 2×150 um GaN HEMT transistor. The drain bias voltages of both devices (Vd1 and Vd2) are set to 65 V, and they are biased to class AB. R1 is set to 2000 ohms. The size of the input stage is small in order to minimize parasitics and power dissipation. The output transistor is sized according to the load-line of the antenna. This may result in smaller periphery (i.e., total gate width) than for a 50 ohm antenna because the load impedance is high. High voltage transistors (e.g., transistors based on GaN HEMT technology) may be used, to maximize power into the antenna, which may (as mentioned above) be a high impedance antenna. In the simulations, the antenna is modeled by a 2-port S-parameter block where s11 is s11 of the antenna feed, s22 is arbitrary, and s21=s12 is the total efficiency (radiation efficiency*(1−|s11|^2)). The simulations use AC coupling to avoid the need for accurate S-parameters at DC. In some embodiments, gallium arsenide transistors are used instead of gallium nitride transistors. In some embodiments, bipolar junction transistors are used instead of field effect transistors.

Figure 4A:
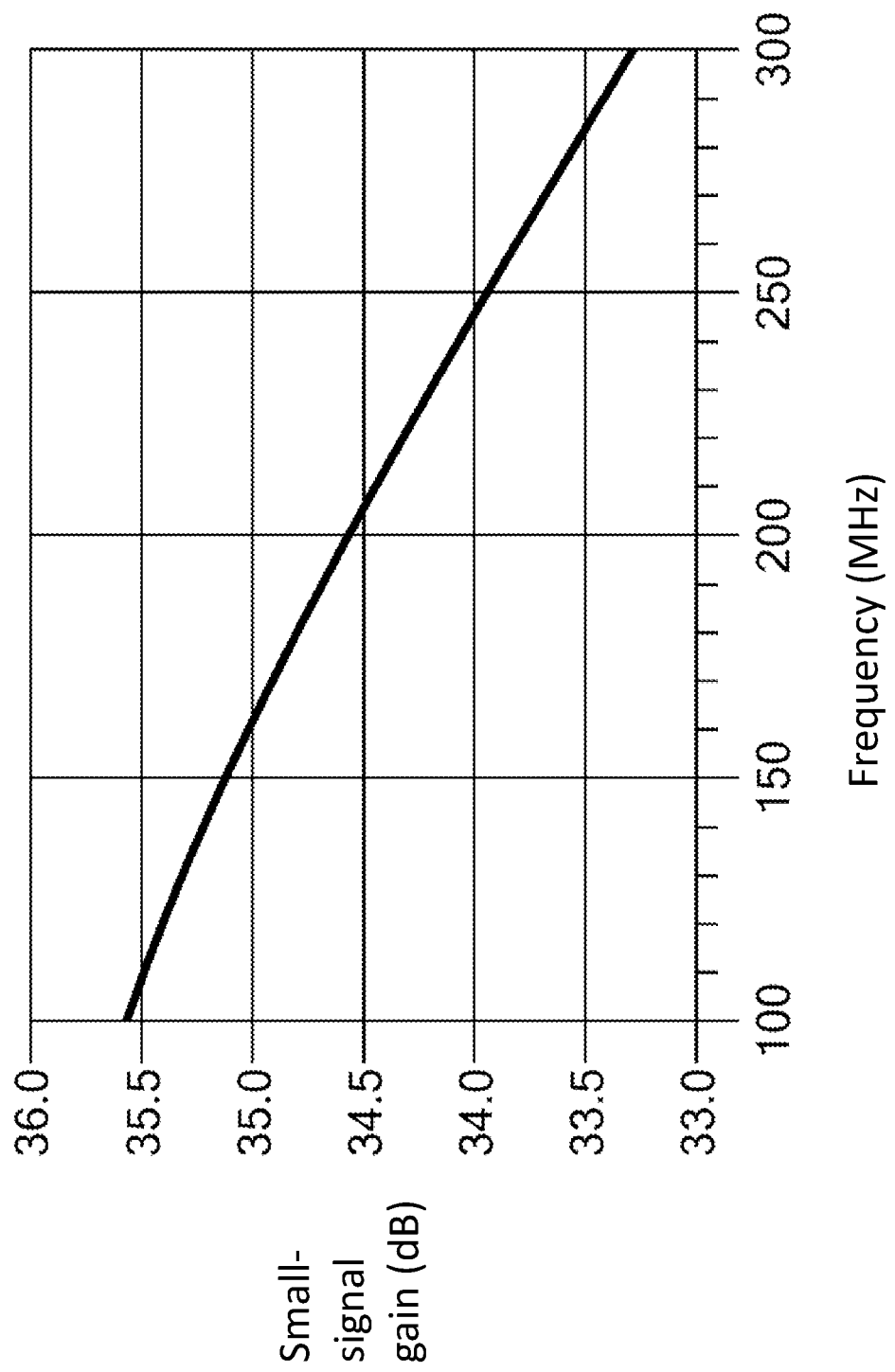
FIG. 4A is a graph of amplifier characteristics, according to an embodiment of the present disclosure.
Figure 4B:
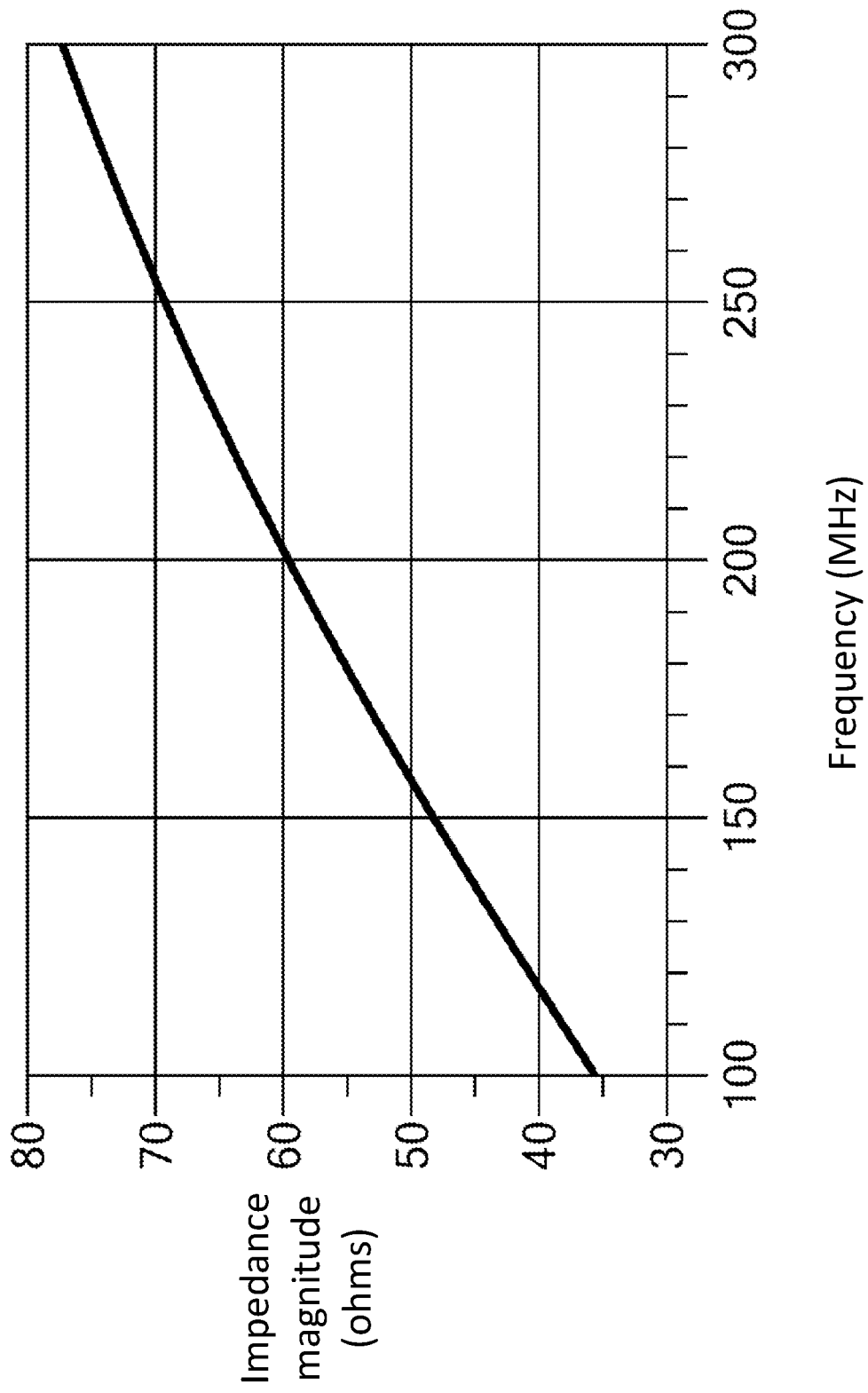
FIG. 4B is a graph of amplifier characteristics, according to an embodiment of the present disclosure.
Figure 4C:
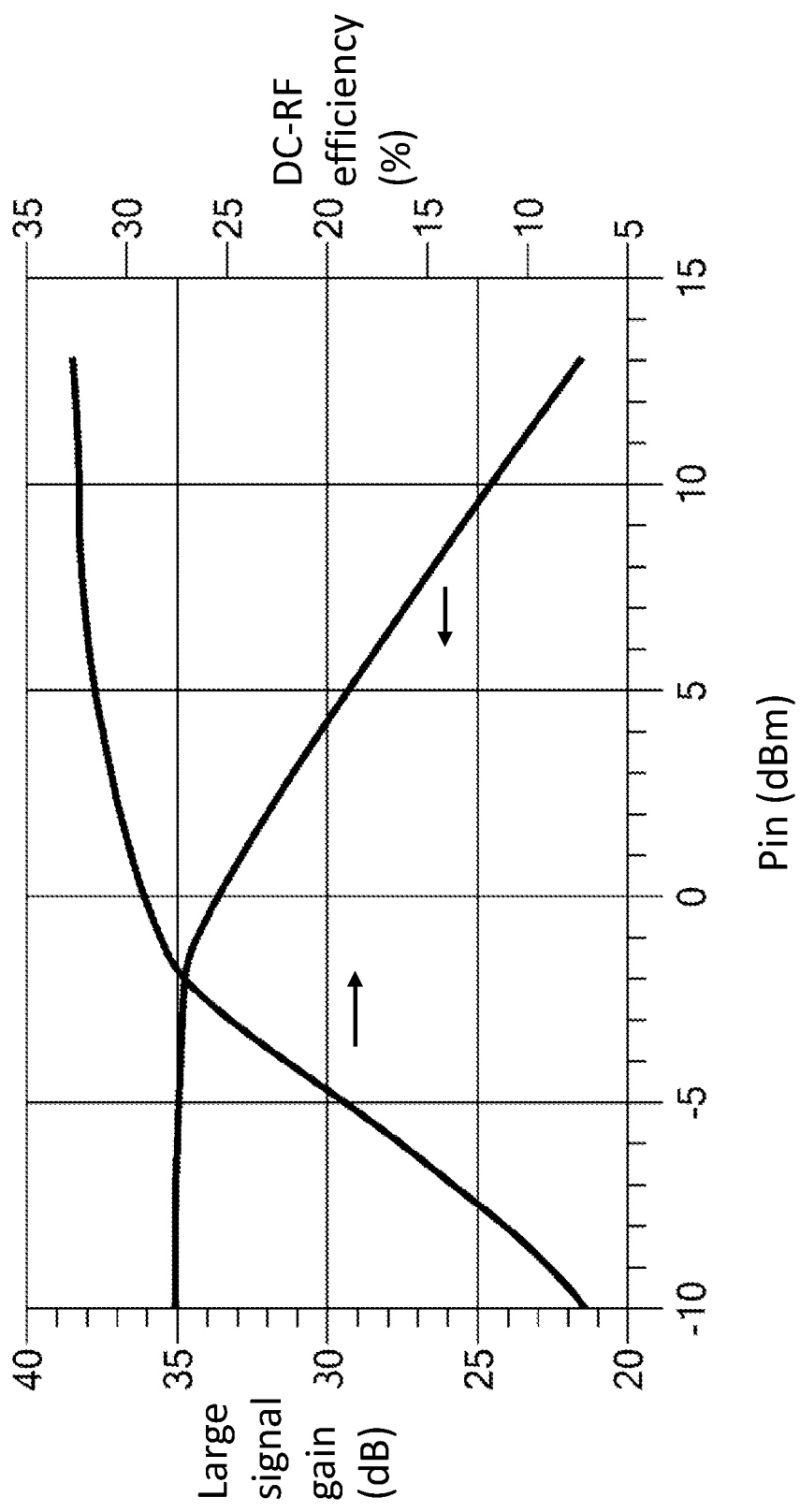
FIG. 4C is a graph of amplifier characteristics, according to an embodiment of the present disclosure.

FIGS. 4A-4C show the results of small signal and large signal simulations of the two-stage amplifier with a 50 ohm input and a 1000 ohm load. The small signal gain varies from 35.5 to 33.5 dB over the frequency range extending from 100 MHz to 300 MHz, and the output impedance is on the order of 50 ohms, which is much smaller than the 1000 ohm load. The simulations show that for varying input power at 160 MHz the amplifier is linear up to about 2 W of power delivered to the load, at which point the efficiency reaches 27%.

Figure 5A:
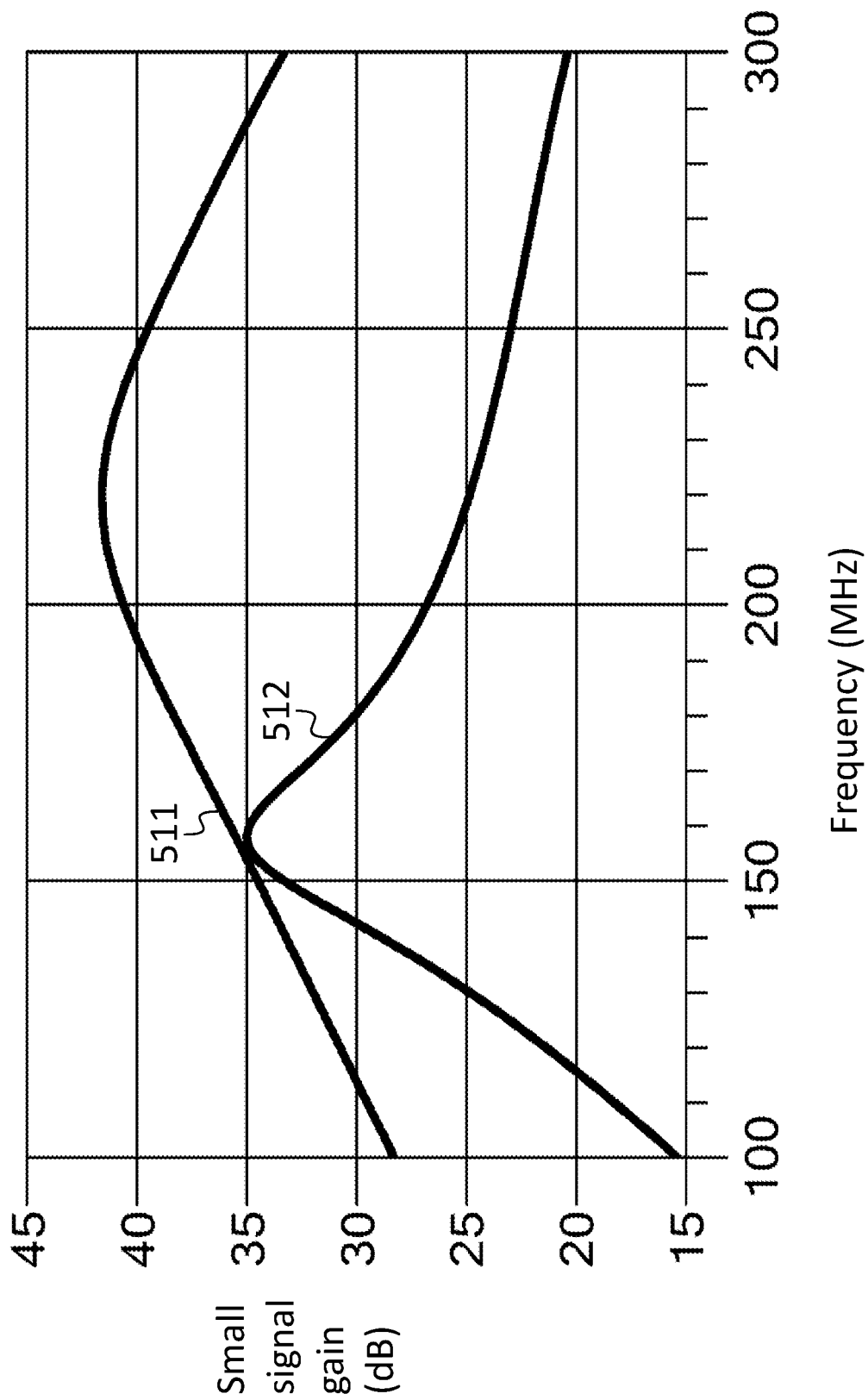
FIG. 5A is a graph of characteristics of two transmitting circuits, according to an embodiment of the present disclosure.
Figure 5B:
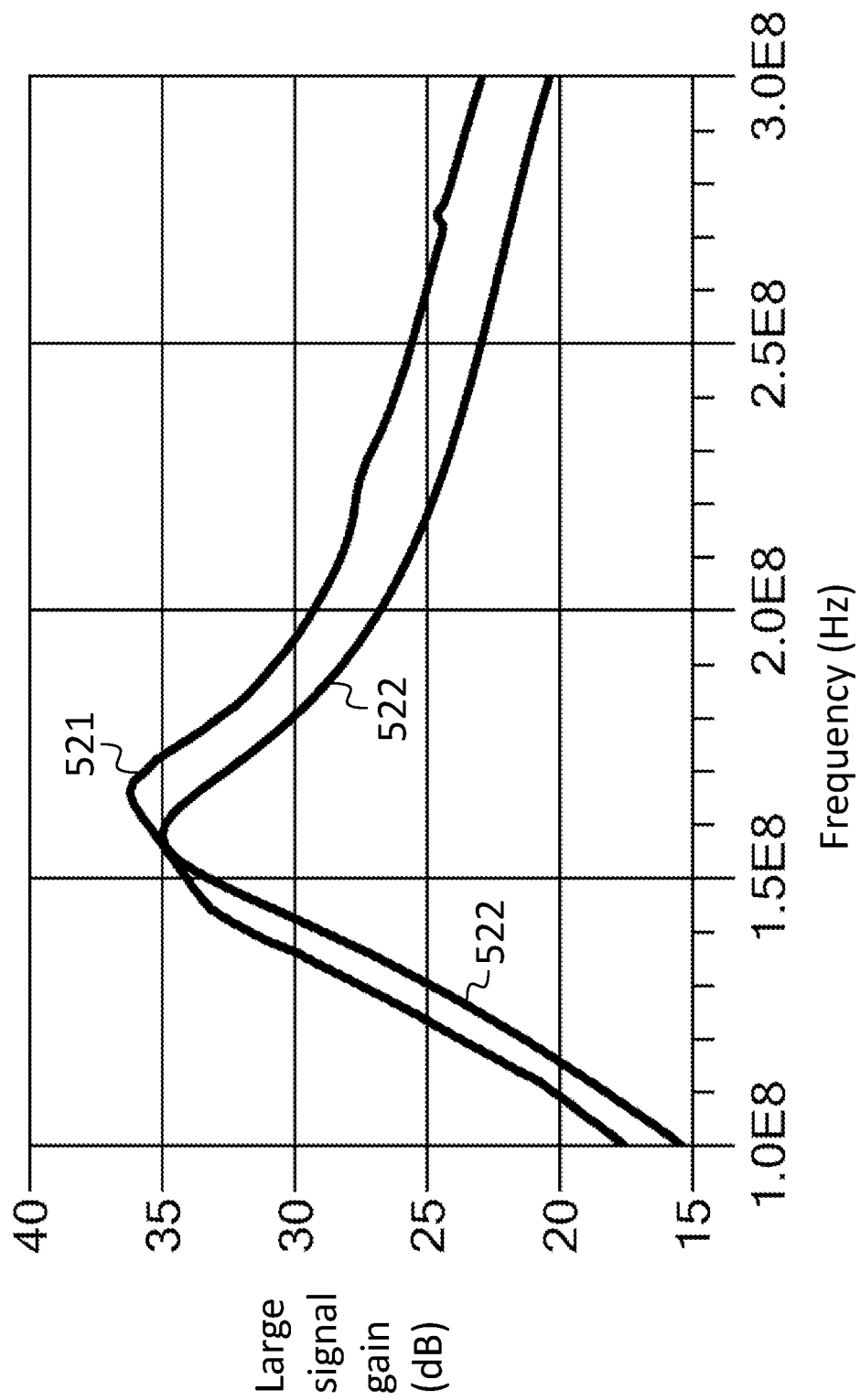
FIG. 5B is a graph of characteristics of two transmitting circuits, according to an embodiment of the present disclosure.
Figure 5C:
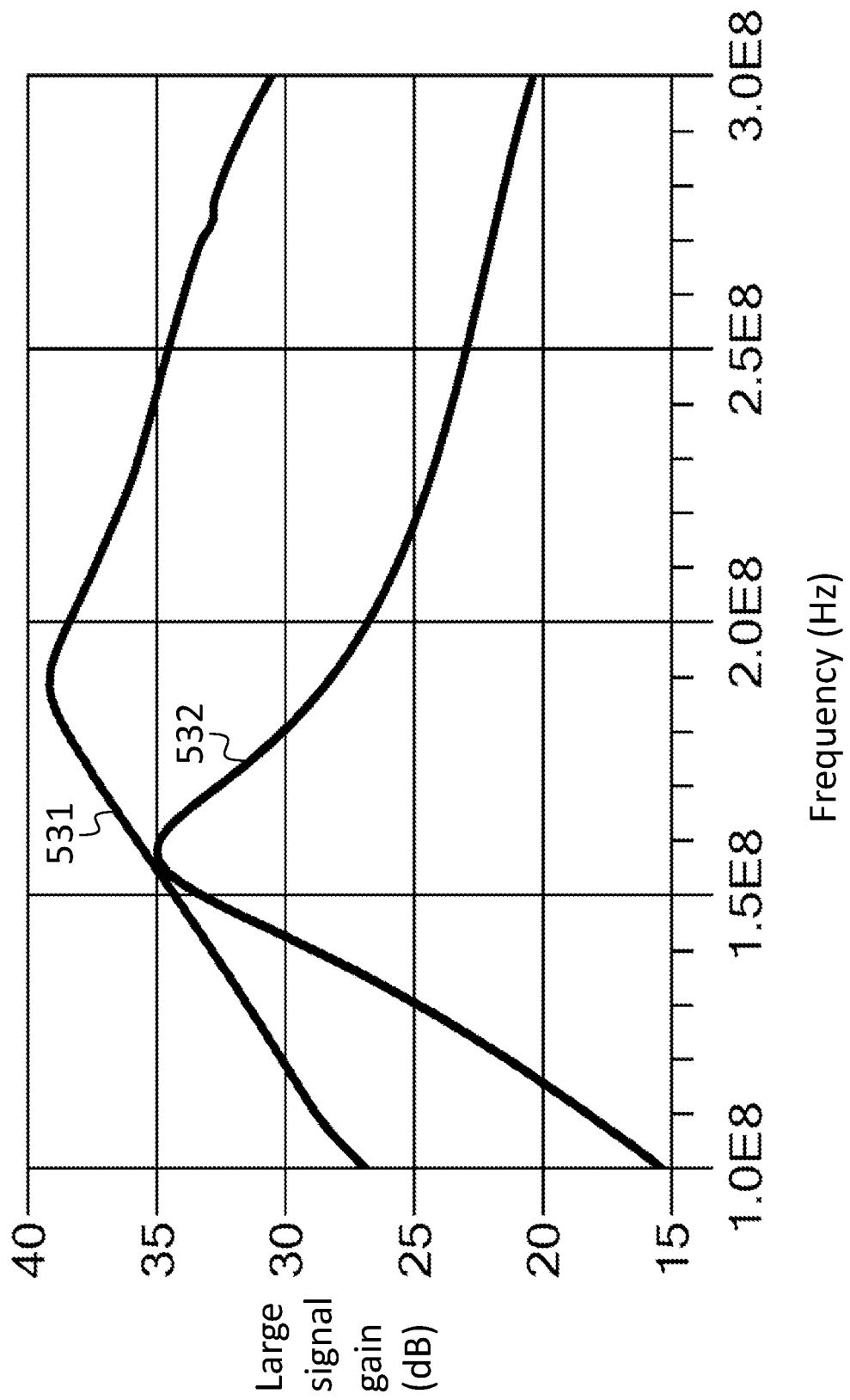
FIG. 5C is a graph of characteristics of two transmitting circuits, according to an embodiment of the present disclosure.

FIGS. 5A-5C show the results of simulations of the combination of the amplifier 110 and the cavity-backed-slot antenna (the combination illustrated, for example, in FIG. 3A). The characteristics of the circuit of FIG. 3A are graphed in three curves 511, 521, 531, and three additional curves 512, 522, 532 (which are all the same) show the characteristics of a circuit consisting of (i) an amplifier having 35 dB of gain and having a frequency-independent output impedance that is equal to the complex conjugate of the input impedance of the cavity-backed-slot antenna at the first resonant frequency, and (ii) the cavity-backed-slot antenna. The plots of FIGS. 5A-5C are the ratio of active gain to directivity and are not in dBi. With small-signal input (FIG. 5A), the bandwidth is very wide (as may be seen from the curve 511) because the low-impedance output is effectively loading the output of the antenna. This behavior may be understood by considering this circuit as analogous to one in which a parallel resonator is driven by an ideal voltage source, the power in the load is relatively independent of the frequency. FIG. 5B shows the large-signal gain for an input signal amplitude that causes the slot 105 to radiate 1 W of power. As can be seen, as ([input) power increases, bandwidth narrows. This is because off resonance the antenna impedance is lower, changing the load line, and this compresses the signal away from the resonance frequency thus reducing bandwidth. However, the effect is minor even up to 10 dB backoff, as may be seen in FIG. 3C, which shows the large-signal gain for a signal amplitude that causes the slot 105 to radiate 0.1 W of power. For example, the large signal gain for the 0.1 W power (curve 531) has very similar gain to the small signal case (curve 511). By contrast, curve 521 exhibits significantly lower bandwidth than curve 511 (where the bandwidth may be defined as the frequency range over which the system has 30 dB of gain).

In some embodiments, the combination of the amplifier 110 and the cavity-backed-slot antenna has a gain varying by less than 20 dB, or by less than 30 dB, over a frequency range spanning an octave and including the first resonant frequency, and the transmitting circuit is configured to transmit at least 0.05 W, at least 0.5 W, at the resonant frequency of the cavity-backed-slot antenna. In some embodiments, As mentioned above, in some embodiments, additional amplifiers 110 may be connected to the slot, each being connected to a different feed of the slot 105, at a different point along the length of the slot, as shown in FIG. 1C. Such an embodiment may include, as shown in FIG. 1C, a signal source 115 having a plurality of outputs (e.g., one output for each of, and connected to a respective one of, the plurality of amplifiers 110). The signal source may receive or generate a plurality of mode signals each corresponding to a respective mode (each mode having, e.g., a different frequency, or a different phase profile), and each of the outputs of the signal source 115 may be a linear combination (e.g., each may be a different linear combination) of the mode signals. Such a circuit may make it possible to transmit a first beam, with a first beam shape, at a first frequency, and a second beam, with a second beam shape (different from the first beam shape), at a second frequency. In some embodiments each output of the signal source 115 is proportional to (e.g., equal to) a respective mode signal (i.e., in each of the linear combinations, all of the weights except one is zero).

In some embodiments, the use of a plurality of feeds, each driven by a respective amplifier, further increases the bandwidth of the transmitting circuit, and provides redundancy (allowing the transmitting circuit to continue operating, e.g., with reduced performance) in the event that one of the amplifiers 110 fails. In some embodiments, the antenna is conformal in the sense that the radiating surface is substantially smooth and may be configured to conform, e.g., to the skin of an aircraft. The amplifier 110 or amplifiers 110 may be on a printed circuit board which may be secured to the conductive (e.g., metal) sheet having the slot 105, and the printed circuit board may extend across the slot and form connections with both edges of the slot (as shown schematically in FIG. 1B, for example). The printed circuit board may be inside the cavity or it may be on the outer surface of the conductive (e.g., metal) sheet having the slot 105. In some embodiments, the antenna is not a slot antenna and is instead a different kind of antenna having a large input impedance at resonance, or a non-resonant antenna with large input impedance.

As used herein, "a portion of" something means "at least some of" the thing, and as such may mean less than all of, or all of, the thing. As such, "a portion of" a thing includes the entire thing as a special case, i.e., the entire thing is an example of a portion of the thing. As used herein, the word "or" is inclusive, so that, for example, "A or B" means any one of (i) A, (ii) B, and (iii) A and B. As used herein, when a second number is "within Y %" of a first number, it means that the second number is at least (1−Y/100) times the first number and the second number is at most (1+Y/100) times the first number.

As used herein, when a method (e.g., an adjustment) or a first quantity (e.g., a first variable) is referred to as being "based on" a second quantity (e.g., a second variable) it means that the second quantity is an input to the method or influences the first quantity, e.g., the second quantity may be an input (e.g., the only input, or one of several inputs) to a function that calculates the first quantity, or the first quantity may be equal to the second quantity, or the first quantity may be the same as (e.g., stored at the same location or locations in memory) as the second quantity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that such spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art. As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

It will be understood that when an element or layer is referred to as being "on", "generally connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present. As used herein, "generally connected" means connected by an electrical path that may contain arbitrary intervening elements, including intervening elements the presence of which quantitatively changes the behavior of the circuit. As used herein, "connected" means (i) "directly connected" or (ii) connected with intervening elements, the intervening elements being ones (e.g., low-value resistors or inductors, or short sections of transmission line) that do not qualitatively affect the behavior of the circuit.

Any numerical range recited herein is intended to include all sub-ranges of the same numerical precision subsumed within the recited range. For example, a range of "1.0 to 10.0" or "between 1.0 and 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein.

Although exemplary embodiments of a broadband active transmitting antenna have been specifically described and illustrated herein, many modifications and variations will be apparent to those skilled in the art. Accordingly, it is to be understood that a broadband active transmitting antenna constructed according to principles of this disclosure may be embodied other than as specifically described herein. The invention is also defined in the following claims, and equivalents thereof.

What is claimed is:

1. A transmitting circuit, comprising:
   a slot antenna; and
   a first amplifier,
   the slot antenna including a slot in a conductive sheet,
   the slot having a length,
   the slot antenna having a first resonant frequency, the first resonant frequency being within 20% of a slot frequency, the slot frequency being between:

a first frequency corresponding, in a first volume, on a first side of the slot, to a wavelength twice the length of the slot, and a second frequency corresponding, in a second volume on a second side of the slot, to a wavelength twice the length of the slot, the first amplifier being connected to the slot through a connection including a conductive path, between the first amplifier and the slot, having a length less than 0.2 times the length of the slot, the slot antenna having an impedance at the first resonant frequency, the first amplifier having an output impedance, at the first resonant frequency, the magnitude of the output impedance of the first amplifier, at the first resonant frequency, being less than 0.25 times the magnitude of the impedance of the slot antenna at the first resonant frequency.

2. The transmitting circuit of claim 1, wherein the slot is a rectangular slot with an aspect ratio greater than 5 to 1.

3. The transmitting circuit of claim 2, wherein the first amplifier is connected to the slot at a distance from an end of the slot, the distance being within 30% of one half of the length of the slot.

4. The transmitting circuit of claim 1, wherein the slot is an annular slot.

5. The transmitting circuit of claim 1, wherein the slot has a reflective cavity backing.

6. The transmitting circuit of claim 5, wherein the reflective cavity has a resonant frequency within 10% of the first resonant frequency.

7. The transmitting circuit of claim 1, wherein the magnitude of the output impedance of the first amplifier, at the first resonant frequency, is less than 0.1 times the magnitude of the impedance of the slot antenna at the first resonant frequency.

8. The transmitting circuit of claim 1, wherein the first amplifier comprises a first stage configured to provide voltage gain, and a second stage configured to provide a reduction in output impedance.

9. The transmitting circuit of claim 8, wherein the second stage comprises a transistor in a common drain or common collector configuration.

10. The transmitting circuit of claim 8, wherein the first stage comprises a transistor in a common source configuration.

11. The transmitting circuit of claim 8, wherein the first amplifier comprises a gallium arsenide or gallium nitride transistor.

12. The transmitting circuit of claim 8, wherein the first amplifier comprises two transistors fabricated on a single monolithic integrated circuit.

13. The transmitting circuit of claim 1, further comprising a second amplifier, wherein:

the first amplifier is connected to the slot antenna at a first point along the slot, and the second amplifier is connected to the slot antenna at a second point along the slot, the second point being different from the first point.

14. The transmitting circuit of claim 13, further comprising a signal source having a first output and a second output, wherein:

the first output is connected to an input of the first amplifier, the second output is connected to an input of the second amplifier, the signal source is configured to supply:

a first linear combination of a plurality of mode signals at the first output, and a second linear combination of the plurality of mode signals at the second output.

15. The transmitting circuit of claim 14, wherein:

the first linear combination is proportional to a first mode signal of the plurality of mode signals, and the second linear combination is proportional to a second mode signal of the plurality of mode signals.

16. The transmitting circuit of claim 1, wherein:

over a frequency range spanning an octave and including the first resonant frequency, the transmitting circuit has a gain varying by less than 20 dB; and the transmitting circuit is configured to transmit at least 0.05 W at the first resonant frequency.

17. The transmitting circuit of claim 1, wherein:

over a frequency range spanning an octave and including the first resonant frequency, the transmitting circuit has a gain varying by less than 30 dB; and the transmitting circuit is configured to transmit at least 0.5 W at the first resonant frequency.

* * * * *